(12) United States Patent
Meichsner

(10) Patent No.: US 10,549,381 B2
(45) Date of Patent: Feb. 4, 2020

(54) SYSTEM AND METHOD FOR HOT STAMPING OF COMPONENTS

(71) Applicant: MAGNA INTERNATIONAL INC., Aurora (CA)

(72) Inventor: Thomas Meichsner, Heppenheim (DE)

(73) Assignee: Magna International Inc., Aurora (CA)

( * ) Notice: Subject to any disclaimer, the term of this patent is extended or adjusted under 35 U.S.C. 154(b) by 417 days.

(21) Appl. No.: 15/031,902

(22) PCT Filed: Oct. 31, 2014

(86) PCT No.: PCT/CA2014/051052
§ 371 (c)(1),
(2) Date: Apr. 25, 2016

(87) PCT Pub. No.: WO2015/061912
PCT Pub. Date: May 7, 2015

(65) Prior Publication Data
US 2016/0263699 A1 Sep. 15, 2016

(30) Foreign Application Priority Data
Oct. 31, 2013 (DE) .......................... 10 2013 222 242

(51) Int. Cl.
*B23K 26/00* (2014.01)
*B23P 23/06* (2006.01)
(Continued)

(52) U.S. Cl.
CPC ...... *B23K 26/0093* (2013.01); *B23K 26/0846* (2013.01); *B23K 26/38* (2013.01);
(Continued)

(58) Field of Classification Search
CPC .. B21D 22/022; B23K 26/0093; B23K 26/38; B23K 26/702; B23P 23/06; B23P 15/28;
(Continued)

(56) References Cited

U.S. PATENT DOCUMENTS 6,751,572 B1  6/2004  Modesto
8,434,231 B2  5/2013  Lenze
(Continued)

FOREIGN PATENT DOCUMENTS

DE  102004034256 B4  4/2007
DE  102009014670 B4  1/2011
(Continued)

*Primary Examiner* — Erin B Saad
(74) *Attorney, Agent, or Firm* — Dickinson Wright PLLC

(57) ABSTRACT

A system for producing components by hot stamping includes a laser cutting station for cutting a plate from a supplied steel-sheet material. The plate has at least one of a predetermined edge-contour and a predetermined cut-out portion for forming a shape of the component. The plate is stored in a storage station, and is subsequently transferred to a furnace station for heating the plate to a predetermined deformation temperature. A press having a hot stamping tool forms the plate into the shape of the component. The system also includes a measuring station disposed downstream of the press for obtaining measurement data relating to the shape of the component that is formed from the plate. The measurement data obtained using the measuring station is provided to a control module of the laser cutting station via a feedback loop.

20 Claims, 1 Drawing Sheet

(51) Int. Cl.
  *B23K 26/38* (2014.01)
  *B23K 26/08* (2014.01)
  *B23K 26/70* (2014.01)
  *C21D 1/62* (2006.01)
  *B23K 101/16* (2006.01)
  *C21D 1/673* (2006.01)
  *B21D 22/20* (2006.01)

(52) U.S. Cl.
  CPC ............ *B23K 26/702* (2015.10); *B23P 23/06* (2013.01); *C21D 1/62* (2013.01); *B21D 22/208* (2013.01); *B23K 2101/16* (2018.08); *C21D 1/673* (2013.01)

(58) Field of Classification Search
  CPC ....... B21J 5/12; B21J 9/00; B21J 9/02; B21K 27/02
  See application file for complete search history.

(56) References Cited

U.S. PATENT DOCUMENTS

| | | | |
|---|---|---|---|
| 9,308,564 B2* | 4/2016 | Potocki | C21D 9/005 |
| 2002/0081169 A1* | 6/2002 | Biederman | B21J 5/12 |
| | | | 408/225 |
| 2007/0193988 A1 | 8/2007 | De Joannis De Verclos | |
| 2009/0155615 A1 | 6/2009 | Chen | |

FOREIGN PATENT DOCUMENTS

| | | |
|---|---|---|
| DE | 102010011762 A1 | 9/2011 |
| WO | 2010085486 A1 | 7/2010 |

* cited by examiner

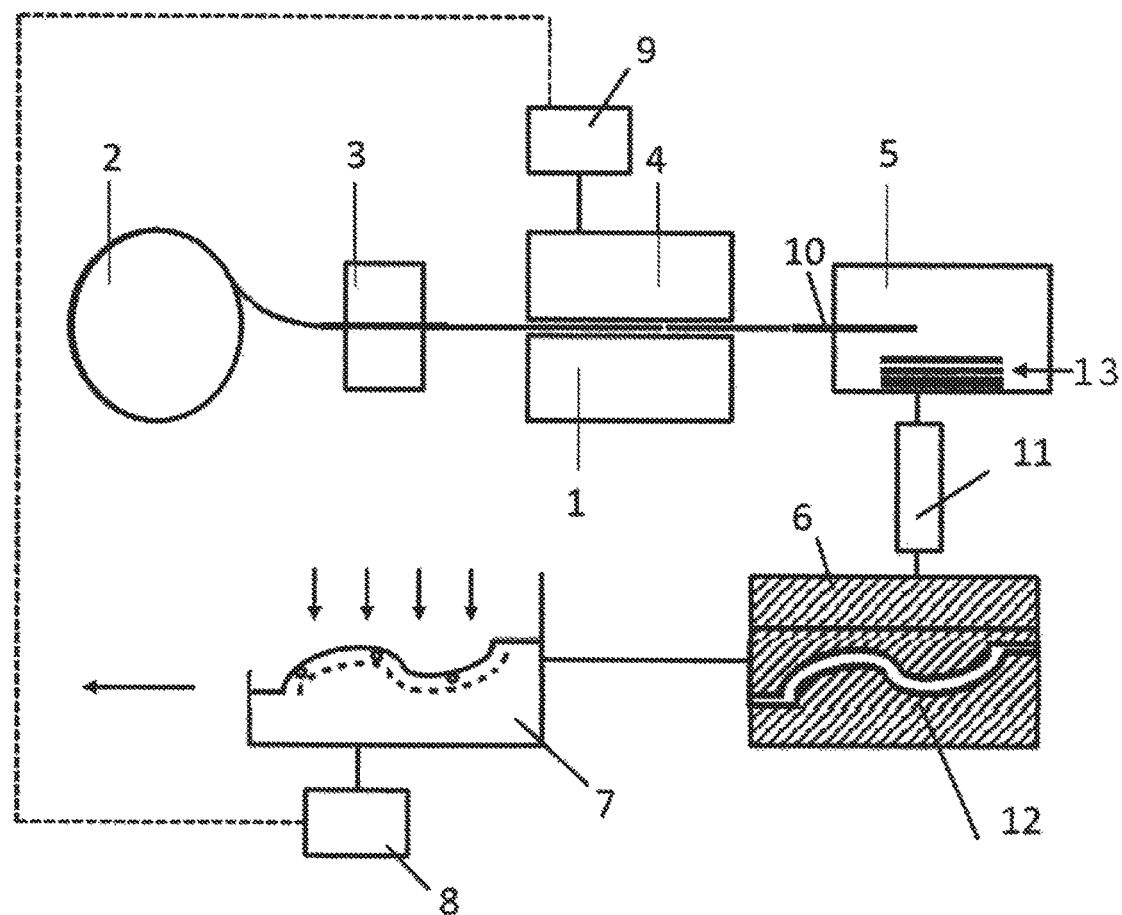

SYSTEM AND METHOD FOR HOT STAMPING OF COMPONENTS

CROSS-REFERENCE TO PRIOR APPLICATIONS

This U.S. National Stage Patent Application claims the benefit of PCT International Patent Application Serial No. PCT/CA2014/051052 filed Oct. 31, 2014 entitled "System and Method for Hot Stamping Of Components," which claims the benefit of German Patent Application No. 102013222242.4 filed Oct. 31, 2013, entitled "System and Method for Hot Stamping Of Components," the entire disclosures of the applications being considered part of the disclosure of this application and hereby incorporated by reference.

A Patent Cooperation Treaty (PCT) application also entitled "System And Method For Hot Stamping Of Components," claiming priority from DE102013222242.4, was co-filed on Oct. 31, 2014. The entire contents of the above-noted PCT application are incorporated herein for all purposes.

FIELD OF THE INVENTION

The invention relates generally to a system for producing components by hot stamping, and to a method for operating the system. More particularly, the invention relates to a system including at least a laser cutting station for creating the contour and/or the cutouts of the component, a storage station, a furnace station for heating the cut-to-size plates to a deformation temperature, and a press having a tool which is designed for hot stamping.

BACKGROUND

Hot stamping, also called press hardening or form hardening, is a relatively young production method within the automotive industry. Because of their strength, hot-stamped components offer very high deformation resistance in the event of a crash. Therefore, particularly components of the kind which are meant not to deform in the event of a crash are hot-stamped. These include, for instance, the A-pillar, B-pillar, bumper cross beam, and side impact bar.

In direct hot stamping a steel blank is austenitized at an elevated temperature, transferred to a cooled die, and deep-drawn to form the desired component. In this way, complex geometries can be formed because the material has excellent formability at high temperatures.

For hot stamping, generally rectangular blanks are heated in a furnace and fed to a press. In the press, each blank acquires via the pressing tool a three-dimensional shape and, if need be, is trimmed already while in the press. Often, however, the component is only subsequently fed to a laser trimming process, since trimming in the tool itself places a heavy load upon the tool. This means that the component must be removed from the press and fed to a further processing station, namely the laser cutting station. Alternatively, it is known to trim the plates for the hot forming process prior to their introduction into the tool.

In industrial production, rolls or stacks of materials are processed and transformed with a wide variety of different cutting and deforming tools into structured components. For the processing, laser cutting systems are used to generate the desired shapes and cutouts. The material is machined on a work rest, which constitutes a flat base surface for the cutting or deforming tool.

DE 10 2004 034 256 B4 discloses an apparatus for cutting sheet metal. A metal band is transported in a transport direction by means of a conveyor. The conveyor has two transport devices arranged in succession in the direction of transport. An opening is formed between two mutually opposite ends of the transport devices. The mutually opposite ends of the transport devices can be moved in the same direction, either in or counter to the direction of transport. Consequently, the opening can thus be shifted in or counter to the direction of transport. Above the opening is found a laser cutting device, the laser beam of which is constantly directed at the opening. In order to produce a chosen cut in a metal band transported on the conveyor, the laser cutting device can be moved both in an X-direction corresponding to the direction of transport and perpendicularly thereto in a Y-direction. The opening is here always moved concurrently with the laser beam. In order to create a plurality of different contour cuts, a plurality of laser cutting apparatuses of this type may also be arranged along the conveyor at a distance apart. A similar apparatus is also known from WO 2010/085486 A1.

These known laser cutting systems process plates at a cycle rate of about ten plates per minute. Should it be desired to make the hot stamping efficient, this cycle rate is too low. The use of laser cutting systems for the prefabrication of plates for hot stamping is not therefore widespread.

It would be beneficial to provide a system and method that overcomes at least some of the above-mentioned limitations.

SUMMARY OF EMBODIMENTS OF THE INVENTION

The object of the invention is to provide a system for hot stamping and a method for operating the system.

According to an aspect of at least one embodiment a system is provided for producing components by hot stamping, the system comprising: a laser cutting station for cutting a plate from a supplied steel-sheet material, the plate having at least one of a predetermined edge-contour and a predetermined cut-out portion for forming a shape of the component; a storage station for storing the plate; a furnace for heating the plate to a predetermined deformation temperature; a press having a hot stamping tool for forming the plate into the shape of the component; and a measuring station disposed downstream of the press for obtaining measurement data relating to the shape of the component that is formed from the plate, wherein the measurement data obtained using the measuring station is provided to a control module of the laser cutting station via a feedback loop.

According to an aspect of at least one embodiment a method is provided for producing components by hot stamping, the method comprising: using a laser at a laser cutting station, cutting a plate from a supplied steel-sheet material, the plate having at least one of a predetermined edge-contour and a predetermined cut-out portion for forming a shape of the component; storing the plate in a storage station; transferring the plate from the storage station to a furnace and heating the plate in the furnace to a predetermined deformation temperature; transferring the heated plate into a press having a hot stamping tool for forming the plate into the shape of the component; in the press, hot stamping the plate into the shape of the component; at a measuring station disposed downstream of the press, obtaining measurement data relating to the shape of the component that is formed from the plate; and providing the measurement data to a control module of the laser cutting station via a feedback loop.

The integration of a measuring station enables the components removed from the tool to be 100% measured and the result to be used as a correction variable. In this context, 100% measured includes measuring the overall dimensions and shape of the component as well as the size and location of various cutouts and recesses.

A method for operating the system is distinguished by the fact that the measuring station registers via a monitoring unit all measurement data and compares these with the nominal specifications. As a result of the size measurement of the components, the deviation from a nominal state is thus registered and stored as a control variable in a simple manner.

In an embodiment the monitoring unit of the measuring station delivers the deviations from the nominal size as information to the control module of the laser cutting station.

In an embodiment the control module of the laser cutting station adapts the trim of the plates to the measurement data received from the monitoring unit of the measuring station in order to minimize deviations from the nominal size.

In an embodiment, through the connection of the monitoring unit and the control module, a feedback loop between the measuring station and the laser cutting station is created.

In an embodiment parameters of the tool are registered and, in addition to the measurement values of the measuring station, are used for the feedback to the laser cutting station.

BRIEF DESCRIPTION OF THE DRAWINGS

The invention will now be described by way of example only, and with reference to the attached drawing. It should be understood that the drawing is not necessarily to scale. In certain instances, details that are not necessary for an understanding of the disclosure or that render other details difficult to perceive have been omitted.

FIG. 1 shows an exemplary system in accordance with an embodiment of the instant invention.

DETAILED DESCRIPTION

FIG. 1 shows an exemplary system, as is used also to create contour cuts in a metal band. The material, for instance the metal band, is unwound from a reel 2 and is provided to a processing station 4 via an aligning station 3. In the aligning station 3, the material is either aligned, or leveled or, indeed, suitably prepared for further processing. The metal band is fed to the processing station 4 via conveyors and/or other transport devices (not illustrated). The processing station 4 is here disposed above the plane of the processing. A work piece support 1 is installed beneath the plane of the processing. After the processing, the workpieces, now separately present, are deposited in a storage station 5. The processing station 4 is a contactlessly working cutting station, for instance a laser cutting station, a water jet cutting station, a plasma cutting station or an erosion cutting station.

In a specific and non-limiting example, the processing station (4) is a laser cutting station. The laser cutting station not only cuts off rectangular pieces from the metal band, but structures the workpiece in its contour and also creates cutouts and recesses. The prefabricated workpieces, after the laser processing station 4, exist in the form of individual plates 10. The plates 10 are deposited as a stack 13 in a storage station 5. The storage station 5 can here be a simple storage station, in which the plates are introduced in such a way that they can easily be removed again. In particular, the plates are introduced and stored in a manner that prevents the blanks from sticking together by adhesion. In a further embodiment of the invention, the storage station 5 can be heated, e.g., a tempering container. In such an embodiment, the plates can be preheated in the tempering container to a temperature above ambient environmental temperature. For instance, the plates can be preheated to a temperature above 100° C., such as for instance 180° C.

The plates 10 from the storage station 5 are introduced into a furnace station 11. In a specific and non-limiting example, the furnace station 11 is designed as a continuous furnace and heats the plates 10 between the storage station 5 and the press 6 to a predetermined temperature as is intended for the hot stamping. From the furnace station 11, the plates 10 are inserted into the tool 12 of the press 6. Then, the forming process takes place. Directly from the tool 12, the deep-drawn component is delivered into a measuring station 7. In the measuring station 7, different measuring points, which are represented schematically in the drawing as small circles, are measured over the entire area of the component. If the result is consistent with the nominal values which are stored in the measuring station 7, the component is accepted and stored. Should a deviation occur, the component is discarded. The deviation of the component from the nominal sizes is registered by a measurement monitoring unit 8, which is connected to the measuring station 7. The monitoring unit 8 relays the deviating values directly to a control module 9, which is connected to the laser cutting station 4. The control module 9 analyses the deviating values and creates parameters therefrom, which serve for the actuation of the laser or lasers for cutting the component.

With the aid of this feedback loop, the components are cut such that, following their deformation in the press 6, they correspond to the nominal sizes.

When the system is calibrated for first-time use, the feedback process requires that roughly 20 plates are produced as scrap until the adjustment of the cutting station leads to the desired result. During ongoing operation, only slight readjustments are then necessary when the measuring station indicates that there is a tendency to deviate from the nominal size.

In order to optimize the control method, it is provided that parameters of the tool 12 are likewise processed. Here, particularly the tool temperature, and possible aging effects of the tool, are important.

By means of the presented feedback loop, the amount of scrap components is reduced.

REFERENCE SYMBOLS 1 workpiece support
2 reel
3 aligning station
4 processing station
5 storage station
6 press
7 measuring station
8 monitoring unit
9 control module
10 plate
11 furnace station
12 tool
13 stack of plates

The invention claimed is:
1. A system for producing components by hot stamping, comprising:

a laser cutting station for cutting a plate from a supplied steel-sheet material, the plate having at least one of a predetermined edge-contour and a predetermined cut-out portion for forming a shape of a component;

a storage station for storing the plate;

a furnace for heating the plate to a predetermined deformation temperature, a press having a hot stamping tool for forming the plate into the shape of the component, and a measuring station disposed downstream of the press for obtaining measurement data relating to the shape and/or size of the component that is formed from the plate, wherein the measurement data obtained using the measuring station is provided to a control module of the laser cutting station via a feedback loop.

2. A system according to claim 1, wherein the storage station is a tempering container.

3. A system according to claim 1, wherein the measuring station registers all the measurement data via a monitoring unit and compares them with nominal specifications for the component.

4. A system according to claim 3, wherein the monitoring unit of the measuring station detects deviations from the nominal specifications and delivers the information to the control module of the laser cutting station.

5. A system according to claim 3, wherein the control module of the laser cutting station adapts the cutting based on the measurement data in order to reduce deviations from the nominal specifications in a subsequent component.

6. A method for operating a system according to claim 1, wherein the measuring station registers all the measurement data via a monitoring unit and compares them with nominal specifications for the component.

7. A method according to claim 6, wherein the monitoring unit of the measuring station detects deviations from the nominal specifications and delivers the information to the control module of the laser cutting station.

8. A method according to claim 6, wherein the control module of the laser cutting station adapts the cutting based on the measurement data in order to reduce deviations from the nominal specifications.

9. A method according to claim 6, wherein a feedback loop between the measuring station and the laser cutting station is created through a connection of the monitoring unit and the control module.

10. A method according to claim 6, wherein parameters of the tool are registered and used for feedback provided to a control module of the laser cutting station.

11. A method for producing components by hot stamping, comprising:

using a laser at a laser cutting station, cutting a plate from a supplied steel-sheet material, the plate having at least one of a predetermined edge-contour and a predetermined cut-out portion for forming a shape of a component;

storing the plate in a storage station;

transferring the plate from the storage station to a furnace and heating the plate in the furnace to a predetermined deformation temperature;

transferring the heated plate into a press having a hot stamping tool for forming the plate into the shape of the component;

in the press, hot stamping the plate into the shape of the component;

at a measuring station disposed downstream of the press, obtaining measurement data relating to the shape of the component that is formed from the plate; and providing the measurement data to a control module of the laser cutting station via a feedback loop.

12. A method according to claim 11, wherein the storage station is a tempering container and comprising heating the plate in the tempering container prior to transferring the plate to the furnace.

13. A method according to claim 11, comprising registering all the measurement data via a monitoring unit of the measuring station, wherein the monitoring unit compares the measurement data with nominal specifications for the component.

14. A method according to claim 13, wherein the monitoring unit of the measuring station detects deviations from the nominal specifications of the component and delivers information relating to the deviations to the control module of the laser cutting station.

15. A method according to claim 14, wherein the control module of the laser cutting station adapts the cutting based on the information relating to the deviations, in order to reduce deviation from the nominal specifications in a subsequent component.

16. A system according to claim 1, wherein in the measuring station, the measurement data is obtained by measuring different points over the entire area of the component.

17. A system according to claim 16, wherein the component is discarded if a deviation occurs between the measurement data and nominal specifications.

18. A method according to claim 6, wherein the storage station is a tempering container, and comprising heating the plate in the tempering container prior to introducing the plate to the furnace.

19. A method according to claim 11, wherein in the measuring station, the measurement data is obtained by measuring different points over the entire area of the component.

20. A method according to claim 19 including discarding the component if a deviation occurs between the measurement data and nominal specifications.

* * * * *